(12) United States Patent
Hoegg

(10) Patent No.: US 7,943,215 B2
(45) Date of Patent: May 17, 2011

(54) MULTI-LAYER FOIL AND PACKAGING MADE OF THIS FOIL

(75) Inventor: Klaus Josef Hoegg, Bonndorf (DE)

(73) Assignees: Klaus-Josef Hoegg, Bonndorf (DE); Hans Alder OHG, Bonndorf (DE)

( * ) Notice: Subject to any disclaimer, the term of this patent is extended or adjusted under 35 U.S.C. 154(b) by 161 days.

(21) Appl. No.: 12/055,935

(22) Filed: Mar. 26, 2008

(65) Prior Publication Data

US 2008/0241500 A1    Oct. 2, 2008

(30) Foreign Application Priority Data

Mar. 29, 2007  (DE) .................. 10 2007 015 554

(51) Int. Cl.
    *B32B 7/02*    (2006.01)
(52) U.S. Cl. .............. 428/34.1; 428/34.6; 428/34.7; 428/35.2; 428/35.4; 428/36.6; 428/36.7; 428/520
(58) Field of Classification Search .......... 428/34.1, 428/34.6, 34.7, 35.2, 35.4, 36.6, 36.7, 520
    See application file for complete search history.

(56) References Cited

U.S. PATENT DOCUMENTS

| | | | |
|---|---|---|---|
| 6,080,478 A | | 6/2000 | Karhuketo |
| 6,153,276 A * | | 11/2000 | Oya et al. .................. 428/35.2 |
| 6,323,308 B1 * | | 11/2001 | Kobayashi et al. ............ 528/354 |
| 6,509,072 B2 * | | 1/2003 | Bening et al. ................. 428/35.4 |
| 6,521,336 B2 * | | 2/2003 | Narita et al. .................. 428/349 |
| 7,285,318 B2 * | | 10/2007 | Kaku et al. .................. 428/195.1 |
| 7,306,093 B2 * | | 12/2007 | McLaughlin et al. ......... 206/83.5 |
| 7,368,160 B2 * | | 5/2008 | Inglis ............................ 428/212 |
| 2002/0127358 A1 | | 9/2002 | Berlin et al. |
| 2007/0042207 A1 | | 2/2007 | Berger et al. |
| 2007/0259139 A1 | | 11/2007 | Furneaux |
| 2008/0008848 A1 | | 1/2008 | Dick et al. |

FOREIGN PATENT DOCUMENTS

| | | |
|---|---|---|
| DE | 42 44 000 A1 | 6/1994 |
| DE | 102004062204 | 12/2005 |
| EP | 1449645 | 8/2004 |
| EP | 1541340 | 6/2005 |
| EP | 1728625 | 12/2006 |
| GB | 2406305 | 3/2005 |
| WO | WO 97/37848 | 10/1997 |
| WO | WO9809812 | 3/1998 |
| WO | WO9812250 | 3/1998 |

* cited by examiner

*Primary Examiner* — Leszek Kiliman

(74) *Attorney, Agent, or Firm* — Ackerman Senterfitt; Peter A. Chiabotti

(57) ABSTRACT

For the packaging of consumables and feed stuffs, which are to be protected from oxygen, however emit moisture, a multilayer foil is proposed, which includes at least one blocking layer and one sealing layer. The blocking layer is characterized by a high barrier function for gas, in particular oxygen, and a good water vapor permeability. The sealing layer ensures good sealing characteristics and a high water vapor permeability.

16 Claims, 1 Drawing Sheet

MULTI-LAYER FOIL AND PACKAGING MADE OF THIS FOIL

TECHNICAL FIELD

The application concerns a multilayer foil, in particular for packaging of consumables and foodstuffs, as well as a packaging comprised of such a foil.

BACKGROUND

Foils are generally employed for packaging consumables and foodstuffs. In order to preserve the freshness of packaged consumables or foodstuffs, foils having a gas impermeable layer are employed (for example DE 102004062204 A1). The gas impermeable layer prevents the entry and the exit of gases. It should in particular be prevented thereby, that oxygen has access to the consumables, which would have promoted spoiling and growth of mold, and at the same time prevent loss of protective gases which are introduced into the packaging, such as nitrogen or carbon dioxide. Such gas impermeable layers are comprised for example essentially of polyamide coated cellulose film, ethylene-vinyl alcohol polymers (EVOH) or other vinyl alcohol polymers (PVOH) or are built up as multiple layers of these materials. In order to protect the consumables against drying, the packaging foils are conventionally also provided with a supplemental layer for blocking water vapor. In order to make these impermeable layer foils fusible, these are conventionally provided with a sealing layer, such as for example polyolefins and in particular polyethylene.

The impermeable foil of polyamide and/or EVOH is by itself water vapor permeable and exhibits poor sealing characteristics, that is, it is not suitable for bonding or fusing, as is necessary for packaging of consumables and food stuffs as a rule. These supplemental layers serving to block water vapor exhibit good sealing characteristics, so that as a result of this layer, on the one hand, a fusible packaging material is obtained and, on the other hand, this packaging foil exhibits in the generally desired matter the supplemental water vapor impermeability.

For certain consumables and food stuffs, in particular for example in the case of raw sausages such as Landjaeger sausages, salami and the like, and also in the case of certain sorts of hard cheeses, such an air and water impermeable packaging is however not optimal. Such a packaging prevents on the one hand the penetration of oxygen and therewith prevents growth of mold, the packaged consumables however cannot dry, so that the residual moisture present in the inside of the consumables, such as raw sausages, leads to an undesired softening of the consumables. In order to prevent this softening of the sausages, until now perforated packaging foils have been employed. These foils may allow the drying of the packaged consumables, but on the other hand, the consumables are exposed to oxygen through the perforations, which could lead to formation of mold. Further, it is known to treat the surface of consumables, such as raw sausages and hams, with substances such as the preservative agents calcium sorbate or "artificial mold", which prevent the growth of mold. Such a surface treatment is however an additional involved process step in the production of the consumables.

SUMMARY

This application is thus concerned with the task of providing a packaging for consumables and food stuffs, which eliminates or minimizes the above-mentioned problems.

This task is inventively solved by a multilayer foil with the characteristics as disclosed herein, such as with a packaging which is comprised substantially of such a foil.

In accordance with an inventive embodiment a foil is provided for packaging consumables and food stuffs, which retains protective gases within the packaging and protects the consumables from oxygen, however allows the emission of water vapor. This foil exhibits an impermeable layer, which combines a high barrier function for gases with a good water vapor permeability. This blocking layer thus satisfies the requirements for protecting the packaged consumables from oxygen and preventing growth of mold, as well as maintaining the protective gas introduced into the packaging, and at the same allowing emission of moisture from the consumable and therewith to allow a drying of the packaged consumables. In order to also make such a foil fusible, so that the foil is suitable for use as a as packaging foil, the foil additionally includes a superficial sealing layer, which possesses good sealing characteristics. Besides this, the sealing layer does not detract from the functional characteristics of the blocking layer, that is the sealing layer exhibits at least an equally high water vapor permeability. Since the gas barrier is brought about by the blocking layer, the sealing layer could be gas permeable. The terms "gas barrier" or as the case may be "gas impermeable" is understood to refer to a barrier or as the case may be a permeability for substances which at normal environmental temperatures are in the gaseous state, in particular oxygen, nitrogen and carbon dioxide.

The multilayer foil exhibits at least one blocking layer with a high barrier function for gasses, so that no gases and in particular no oxygen can penetrate into the packaged goods. All layers of the multilayer foil exhibit a high water vapor permeability, so that the moisture emitted by the packaged goods can penetrate through the multilayer foil toward the outside.

Suitable materials for the blocking layer include polyamide, coated cellulose films, ethylene-vinyl alcohol polymers (EVOH) or other polyvinyl alcohol polymers (PVOH). The blocking layer can be comprised essentially of one of these materials. It is however also possible that the blocking layer itself is built up of multiple layers, for example of an EVOH-layer, which is provided on one side or on both sides with a polyamide layer. These multilayer blocking layers can be produced by co-extrusion or by lamination and/or coating.

Criteria for the selection of the materials of the blocking layer and for selecting the thickness of the blocking layer include the permeability values for the gases, in particular for oxygen as well as for water vapor. The permeability for gases should be as low as possible, the permeability for water vapor as high as possible. Preferably a blocking layer is employed, of which the permeability value for molecular oxygen is smaller than 35 $cm^3/m^2$ in 24 h with a partial pressure differential of 1 dbar, at a temperature of 23° C. and a 0% relative humidity. A permeability number for water vapor is preferably commensurate with the drying relationship of the respective consumable or food stuff. For example, a water vapor permeability of greater than 20g/$m^2$ at a partial pressure differential of 1 dbar, a temperature of 23° C. and 85% relative humidity can be selected.

Materials which satisfy these requirements with regard to gas barrier function and water vapor permeability are known to those working in this art. For example, polyamide, coated cellulose films, EVOH and/or other PVOHs are employed as individual layers or in combinations as multilayers.

In order to make the foils fusible for use as packaging materials, a sealing layer is provided, which exhibits good sealing characteristics and at least does not impede the water vapor permeability of the total foil.

For this sealing layer, preferably a material is employed, which is comprised essentially of polyhydroxy carboxylic acid. Preferably those polyhydroxy carboxylic acids are employed, which are comprised of hydroxy carboxylic acids, which are obtained from natural substances. These materials are also biologically decomposable. Accordingly, regenerative raw materials for the production of the foils can be employed therewith, and the packaging is biologically decomposable in an ecologically friendly manner.

Preferred examples for such hydroxy carboxylic acids obtained from natural substances include food grade acids and fruit acids. The term food grade acids includes acetic acid, lactic acid, citric acid, malic acid, tartaric acid, succinic acid, adipic acid, fumaric acid. The term partially overlaps with fruit acids. Polylactic acids in particular are suitable as materials for the sealing layer. Polylactic acid foils (PLA-foils) are characterized by forming good seals at low sealing temperatures, whereby they characterize themselves as particularly suitable for the sealing of consumables and food stuffs. The PLA-foil is completely biologically decomposable and can be produced from agriculturally cultivated plants. Further, also cellulose derivatives, in particular coated cellulose films, can be considered as sealing material.

The sealing layer satisfies the function of making the packaging foil fusible. In advantageous manner the seal layer can be formed with a small layer thickness and a high gas and water vapor permeability.

The blocking layer and the sealing layer can be co-extruded, in order to form a multilayer laminate. Likewise it is possible to join the blocking layer and the sealing layer to each other in a lamination process or to apply the sealing layer by coating.

The composite multilayer foil is preferably transparent, so that the packaged consumable is visible to the consumer. Besides this, the foil can preferably be printed.

Preferably the blocking layer is selected from the following group of barrier films: polyamide-cast films, polyamide-stretch films, produced by casting or stretching, polyamide-EVOH-polyamide-multilayer films, cellulose coating, substrate films with PVOH.

The sealing layer is preferably selected from the following group of sealing films: PLA-films, PLA-coatings, cellulosic film-coating.

The mentioned barrier films and sealing films can be used in any combination.

In a preferred embodiment the blocking layer is co-extruded in three parts of two polyamide-layers and there-between sandwiched EVOH-layer and stretched. The blocking layer exhibits a thickness of 15μ to 25μ. The blocking layer is laminated with a PLA-sealing layer by adhesion. The PLA-sealing layer has a thickness of 20μ to 30μ.

In one application of the packaging foil the barrier layer forms the outer side of the packaging, while the sealing layer forms the inner side of the packaging, in order to be able to be sealed to a corresponding second sheet or another type packaging material.

BRIEF DESCRIPTION OF THE DRAWINGS

In the figures, one example of the inventive embodiment is represented. There is shown in.

DETAILED DESCRIPTION

Figure 1:
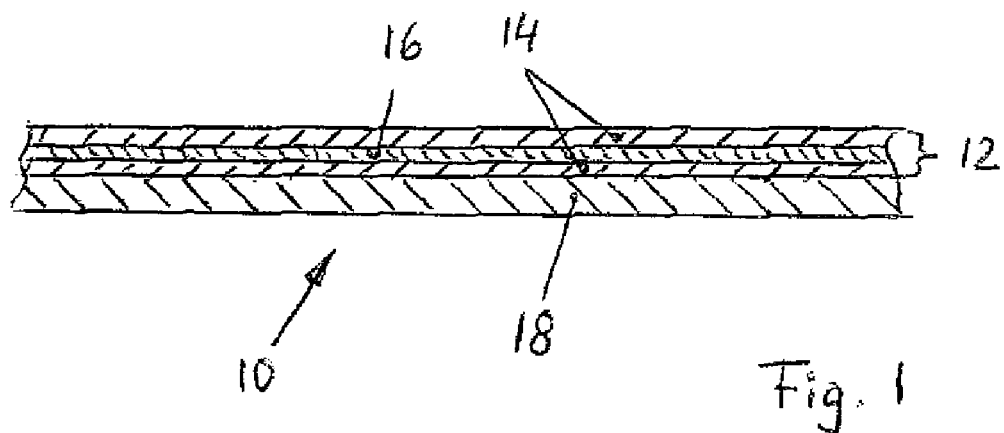
FIG. 1 a section through a multilayer foil according to the inventive embodiment.

FIG. 1 shows the buildup of the multilayer foil 10. The foil exhibits a blocking layer 12, which exhibits a high barrier function for gases and a good water vapor permeability. The blocking layer 12 is co-extruded as three layers of two polyamide layers 15 and a there-between located EVOH-layer 16. The blocking of layer 12 is laminated with a polyacrylate layer 18 adhesive. The polyacrylate layer 18 exhibits good sealing characteristics and a high water vapor permeability.

Figure 2:
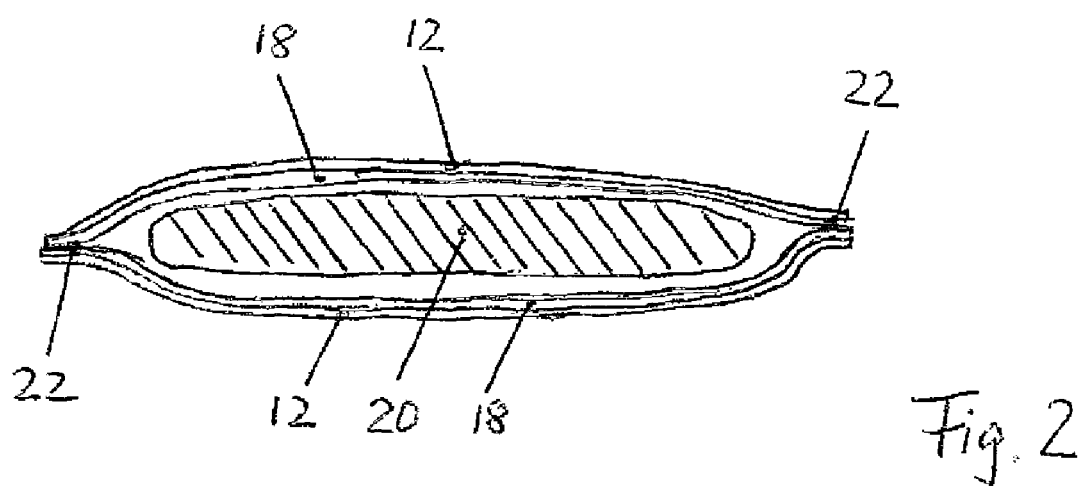
FIG. 2 the use of such a foil as packaging.

In FIG. 2 the use of the multilayer foil as packaging for a consumable 20 is shown. The consumable 20 is so located between the foils 10, that the sealing layer 18 of the foils is respectively located on the consumable 20 facing inner side, while the blocking layer 12 forms the outer side of the packaging. On the edges 22 of the packaging then, the sealing layers 18 of the sheet contacting each other are fused to each other.

The invention claimed is:

1. A foil system for packaging, comprising:
a multilayer foil in which all layers of the multilayer foil exhibit water vapor permeability, in which at least one foil layer is a blocking layer with a high barrier function for gases and in which at least one outer surface of the multilayer foil is a sealing layer with sealing characteristics;
wherein the blocking layer exhibits an oxygen permeability of less than 35 cm3/m2 in 24 h at a partial pressure differential of 1 dbar, a temperature of 23° C. and 0% relative humidity.

2. The foil system according to claim 1, wherein the blocking layer is selected from the group consisting of polyamide, coated cellulose film, ethylene vinyl alcohol-polymer (EVOH), other vinyl alcohol-polymers (PVOH) or a combination thereof.

3. The foil system according to claim 2, wherein the blocking layer includes a layer selected from the group consisting of polyamide, coated cellulosic film, ethylene-vinyl alcohol polymers (EVOH), polyvinyl alcohol-polymer (PVOH) or a combination thereof.

4. The foil system according to claim 1, wherein the blocking layer is a multilayer foil, which includes a combination of at least two layers, which are selected from the group consisting of layers of polyamide, coated cellulose film, ethylene-vinyl alcohol polymers, other vinyl alcohol polymers or a combination thereof.

5. The foil system according to claim 1, wherein the blocking layer exhibits a water vapor permeability of greater than 20 g/m$^2$ at a partial pressure differential of 1 dbar, a temperature of 23° C., and 85% relative humidity.

6. The foil system according to claim 1, wherein the sealing layer is comprised substantially of polyhydroxy carboxylic acids.

7. The foil system according to claim 6, wherein the polyhydroxy carboxylic acids are comprised substantially of hydroxycarboxylic acids which are obtained from natural materials.

8. The foil system according to claim 7, wherein the hydroxy carboxylic acids are food grade acids.

9. The foil system according to claim 8, wherein the hydroxy carboxylic acids are essentially polylactic acids.

10. The foil system according to claim 9, wherein the multilayer foil is a laminate, the blocking layer and the sealing layer are formed by co-extrusion.

11. The foil system according to claim 9, wherein the blocking layer and the sealing layer are laminated in the form of foils.

12. The foil system according to claim 9, wherein the blocking layer is applied as a coated system upon the sealing layer.

13. The foil system according to claim 9, wherein the sealing layer is applied as coated system upon the blocking layer.

14. The foil system according to claim 13, wherein the foil is printable.

15. The foil system according to claim 13, wherein the foil is transparent.

16. Packaging for consumables, comprising:
- a multilayer foil in which all layers of the multilayer foil exhibit water vapor permeability, in which at least one foil layer is a blocking layer with a high barrier function for gases and in which at least one outer surface of the multilayer foil is a sealing layer with sealing characteristics;
- wherein the blocking layer is a multilayer foil, which includes a combination of at least two layers, which are selected from the group consisting of layers of polyamide, coated cellulose film, ethylene-vinyl alcohol polymers, other vinyl alcohol polymers or a combination thereof;
- wherein the blocking layer exhibits an oxygen permeability of less than 35 $cm^3/m^2$ in 24 h at a partial pressure differential of 1 dbar, a temperature of 23° C. and 0% relative humidity;
- wherein the blocking layer exhibits a water vapor permeability of greater than 20 $g/m^2$ at a partial pressure differential of 1 dbar, a temperature of 23° C., and 85% relative humidity; and
- wherein the sealing layer is comprised substantially of polyhydroxy carboxylic acids.

* * * * *